United States Patent [19]

Gutridge

[11] 3,895,961

[45] July 22, 1975

[54] ELECTRODEPOSITION OF IRON ACTIVE MASS

[75] Inventor: Ian Paul Gutridge, Kingswinford, England

[73] Assignee: The International Nickel Company, Inc., New York, N.Y.

[22] Filed: July 29, 1974

[21] Appl. No.: 492,591

Related U.S. Application Data

[63] Continuation of Ser. No. 313,446, Dec. 8, 1972, abandoned.

[52] U.S. Cl. .................. 136/76; 136/23; 136/25
[51] Int. Cl. ........................................ H01m 35/30
[58] Field of Search ............. 136/76, 75, 25, 23, 20; 204/48

[56] References Cited
UNITED STATES PATENTS

| 983,430 | 2/1911 | Estelle | 136/25 |
| 2,554,125 | 5/1951 | Salauze | 136/25 |
| 3,345,212 | 10/1967 | Schweitzer | 136/76 |
| 3,518,170 | 6/1970 | Koretzky | 204/48 |
| 3,525,640 | 8/1970 | McCormick et al. | 136/76 |
| 3,527,613 | 9/1970 | Hardman | 136/76 |
| 3,574,067 | 4/1971 | Spiro | 204/48 |
| 3,671,321 | 6/1972 | Herman et al. | 136/76 |

*Primary Examiner*—John H. Mack
*Assistant Examiner*—C. F. LeFevour
*Attorney, Agent, or Firm*—Francis J. Mulligan, Jr.; Ewan C. MacQueen

[57] ABSTRACT

Iron battery active mass is made by electrodepositing hydroxide on a cathode at a cathode current density of about 10 to about 100 mA/cm$^2$, from an aqueous electrolyte having a pH of about 0.5 to 3 and containing ferrous ion and nitrate ion. The electrolyte can also contain copper ion to provide a battery active mass containing iron and copper.

7 Claims, No Drawings

ELECTRODEPOSITION OF IRON ACTIVE MASS

This is a continuation of application Ser. No. 313,446, filed Dec. 8, 1972, now abandoned.

In nickel-iron storage batteries the negative active mass is commonly a mixture of alpha iron and magnetite ($Fe_3O_4$). This active mass is normally produced by flooding pure, finely divided iron with hot water and then heating it in the presence of air on steam-heated tables to produce a powdery mixture of alpha Fe and $Fe_3O_4$. This mixture is finely ground and rammed into steel tubes or pockets in steel sheets which act as current conductors.

In terms of the capacity that results from the reversible reduction and oxidation of the iron oxide during cycles of charging and discharging no more than 20 to 23 percent of the iron in the mass is normally utilized. Our primary object in this invention is to produce active mass in which a higher proportion of the iron, which may be as high as 40 percent, is utilized.

It is desirable in any battery to make the ratio by weight of the active mass to the metal which holds or supports it as high as possible, and also to reduce the total weight. To this end foil is used as the supporting material in some nickel-cadmium batteries. However, the conventional iron active mass described above cannot be made to adhere to foil.

An important secondary object in this invention is to provide a process by which iron active mass may be so formed on foil or other conducting support as to adhere to it. This support may be of nickel, iron, copper or an alloy of two or all of these metals.

It is an object of the present invention to provide a process for producing negative, iron, active battery mass.

It is another object of the invention to provide a process for producing battery electrodes containing negative, iron, active battery mass.

Other objects and advantages of the invention will become apparent from the following description.

According to the invention, iron active mass is electrolytically deposited on an electrically conducting support made a cathode in an aqueous electrolyte containing ferrous ions and nitrate ions and having a bulk pH from 0.5 to 3, and preferably from 1 to 2.8. The cathode current density to be used is about 10 to about 100 milliamperes per square centimeter ($mA/cm^2$).

In general, the aqueous electrolyte used to form the active mass by means of the process of the present invention is about 0.3 to about 1.0 molar (M) with respect to ferrous ion and about 0.4 to about 2.5 M with respect to nitrate ion with the molar ratio of ferrous ion to nitrate ion being about 0.3 to about 2.0. The electrolyte can also contain sulphate ion, ammonium ion and other ions and dissolved materials which do not detrimentally affect the process of the present invention.

The deposition of the active mass, which consists essentially of iron hydroxide, is the result of increase in the pH at the cathode. This increase may be brought about by either or both of two competing reactions, namely the reduction of nitrate ions to yield ammonia, or related products, and loss of hydrogen ions resulting from hydrogen evolution at the cathode.

The properties of the deposited active mass are such that it is useful in itself and can, if desired, be stripped from the support for use elsewhere. However, the main value of the invention lies in the possibility of depositing a layer of adherent iron active mass on foil, and when the object is to do this hydrogen evolution should be avoided as far as possible. This can be done by appropriate control of the conditions of electrolysis, and particularly of the cathode current density and the bulk pH.

The current density at the cathode is preferably about 30 $mA/cm^2$. As the current density increases, so the tendency for hydrogen to be evolved increases, and in order to avoid any significant evolution of hydrogen, the current density should not be more than about 60 $mA/cm^2$. At very low pH, e.g., about 0.5, high current density is required, and for this reason the pH is preferably 1 or more. At about pH 2.8 ferric iron, which is invariably present as a result of some oxidation of the ferrous iron, precipitates, and it is in order to avoid the production of undesirable sludge in the electrolyte that the pH must not exceed 3 and preferably does not exceed 2.8.

When the deposit reaches a thickness of about 25 microns, the amount of hydrogen evolved at the cathode, even if the current density and pH have been suitably correlated, is such that it tends to dislodge the deposit. This drawback can be overcome by another feature of the invention, which consists in co-depositing copper with the iron hydroxide in an amount of from 1 to 20 percent by weight of the total deposit. This can be done by including any suitable copper salt in the electrolyte, for example, cupric nitrate. In the subsequent use of the active mass in a battery the copper is inert but nevertheless presents the advantage of increasing the conductivity of the active mass. Other metals which are compatible with iron electrodes and are known to be capable of inhibiting the hydrogen evolution reaction, e.g., cadmium, may be used in place of copper.

The electrolyte, which preferably has essentially the composition of ferrous nitrate, can be made in various ways. One way consists in mixing a ferrous salt and a metal nitrate to produce an insoluble precipitate of the anion of the salt and the metal of the nitrate, which is removed. Another way consists in mixing a ferrous salt and ammonium nitrate.

In forming an adherent deposit on metal foil, the process should be carried on for so long that the weight of the deposit is at least equal to the weight of the foil.

The foil is preferably nickel, but may be of any other suitable metal such as copper or iron. In order to save weight, it should be as thin as is feasible, foil 0.007 mm. thick being very suitable.

This foil may advantageously be perforated, and a stack of the foils bearing the deposits may then be formed into a battery plates as described in U.K. Pat. No. 1,246,048.

Because of the excellent properties of the active mass deposited according to the invention, it may also be used, if desired, in tubes or pockets. When the mass is to be so used, it may be continuously removed from the support as it is deposited. For example, it may be deposited on a rotary drum cathode and be removed by a scraper.

When used in a battery the active mass must of course undergo the reversible reaction of reduction and oxidation, and as the deposited hydroxide is essentially free from iron, and hence of low conductivity, evolution of hydrogen will occur preferentially to the reduction of the iron hydroxide during the reduction step unless sulfur is present to inhibit the hydrogen evolution reaction. While this sulfur can be introduced into the deposit during the formation of the active mass, if a suitable sulfur salt having sulfur in an oxidation state lower than the oxidation state of sulfur in sulfate ion, for example, sodium thiosulfate or sodium sulfite, is included in the electrolyte used for the deposition, these salts tend to decompose at the low pH of the electrolyte. Accordingly, it is preferred to perform the steps of initially charging the electrode (which consists of the conducting support bearing negative active mass formed on it as described) in a solution which contains a sulfur salt so that sulfur is introduced into the active mass. The sulfur may be derived from an alkali metal sulfide or polysulfide present in a concentration of from $10^{-3}$ to $10^{-1}$ molar in the solution used for the initial electrolytic charging, the amount of sulfur introduced into the active mass amounting to from 0.1 to 1.0 percent by weight. This sulfur may be present in the active mass as elemental sulfur or sulfide.

EXAMPLE 1

An aqueous solution of ferrous nitrate was prepared by mixing solutions of ferrous sulfate and lead nitrate and filtering off the precipitated lead sulfate. The concentration of ferrous ions was 0.75 M. cupric nitrate was added to give a 0.053 M solution, and the pH was adjusted to 1.65 with dilute nitric acid. The resultant solution was then made the electrolyte in a cell in which the anode was graphite, the cathode was nickel foil and the temperature was 20°C., and current was passed for 10 minutes at a current density of 29.0 mA/cm$^2$. An adherent deposit 85 microns thick was formed on the nickel and contained 10.6 percent copper by weight. The electrode of nickel foil bearing this deposit was then charged by being made the cathode in an aqueous solution of 20 percent potassium hydroxide plus 0.0075 M sodium sulfide at a current density of 10 mA/cm$^2$ for about 15 hours. This electrode was then cycled in an aqueous solution of 20 percent potassium hydroxide containing 1.5 gram per liter lithium hydroxide and gave a capacity of 0.696 ampere-hour per gram (Ah per g) of iron, which is equivalent to 48.4 percent utilization of the iron or, since the copper does not contribute to the capacity, an effective utilization of 40.6 percent.

EXAMPLE 2

The aqueous electrolyte was formulated to contain 0.80 M ferrous sulfate, 0.70 M ammonium nitrate and 0.07 M cupric nitrate. As in Example 1, the cell contained a graphite anode and a cathode of nickel foil, but during operation the temperature of the electrolyte was 15°C. and the pH 1.6. Current at a cathode density of 35 mA/cm$^2$ was passed for 5 minutes and an adherent deposit 50 microns thick containing 11.2 percent copper by weight was formed. The electrode was charged in an aqueous solution of 20 percent potassium hydroxide containing 0.015 M sodium sulfide at 10 mA/cm$^2$ for about 15 hours. On cycling in the same electrolyte of 20 percent potassium hydroxide and 1.5 g/l lithium hydroxide this electrode gave 0.573 Ah per g of iron plus copper, which is an effective utilization of 39.8 percent.

Although the present invention has been described in conjuction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An electrolytic process for forming negative, hydroxidic iron active mass on a metal foil in which the active mass as electrolytically deposited is adherent to the foil and comprises essentially iron hydroxide and about 1 to about 20 percent total by weight of copper comprising electrolytically depositing said active mass onto said metal foil from an aqueous electrolyte containing ferrous ions, nitrate ions and a salt of copper and having a bulk pH of about 0.5 to about 3 at a cathode current density of about 10 to 100 milliamperes per square centimeter for a period of time sufficient so that the weight of the deposit at least equals the weight of the foil.

2. A process as in claim 1 in which the pH of the electrolyte is from 1 to 2.8.

3. A process as in claim 1 in which the electrically conducting support is metal foil and the cathode current density is less than about 60 mA/cm$^2$.

4. A process as in claim 1 in which the deposit of hydroxidic iron active mass is initially electrolytically charged in a solution containing a sulfur salt so that the sulfur is introduced into the deposit during initial charging.

5. A process as in claim 4 in which the initial charging is effected in a solution containing potassium hydroxide, lithium hydroxide and an alkali metal sulfide or polysulfide.

6. Negative iron active mass produced by a process according to claim 1.

7. An electrode consisting of a conducting support bearing negative active mass formed on the support by a process according to claim 1.

* * * * *